United States Patent
Siri

(10) Patent No.: US 6,281,485 B1
(45) Date of Patent: Aug. 28, 2001

(54) MAXIMUM POWER TRACKING SOLAR POWER SYSTEM

(75) Inventor: Kasemsan Siri, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/670,776

(22) Filed: Sep. 27, 2000

(51) Int. Cl.$^7$ .................................................. G01C 21/02
(52) U.S. Cl. ...................... 250/203.4; 126/601; 320/150; 323/906
(58) Field of Search .......................... 250/203.4; 126/573, 126/574, 600, 601; 323/272, 906; 320/150

(56) References Cited

U.S. PATENT DOCUMENTS 5,847,549 * 12/1998 Dodson, III ........................ 323/220
6,037,758 * 3/2000 Perez ................................. 323/268

\* cited by examiner

*Primary Examiner*—Shawn Riley
(74) *Attorney, Agent, or Firm*—Derrick Michael Reid

(57) ABSTRACT

A maximum power tracker maximizes the power deliverable from a power source, such as a solar array using increasing, decreasing and maintaining states controlled by a set point signal modulated by a dither signal for stabilized regular power tracking during under demand conditions and maximum power tracking during periods with over demand conditions of a load. Multiple converters and respectively maximum power trackers can be coupled in parallel using shared bus control signal for fault tolerant equalized power conversion through the converters.

13 Claims, 8 Drawing Sheets

MULTIPLE CONVERTER MAXIMUM POWER TRACKING SYSTEM

MULTIPLE CONVERTER MAXIMUM POWER TRACKING SYSTEM

PARALLEL CONVERTER MAXIMUM POWER TRACKING SYSTEM

MULTIPLE CONVERTER MAXIMUM POWER TRACKING SYSTEM

MAXIMUM POWER TRACKER

SOLAR ARRAY CURRENT PROFILE

SOLAR ARRAY POWER PROFILE

MAXIMUM POWER TRACKING SOLAR POWER SYSTEM

BACKGROUND OF THE INVENTION

Peak power trackers have been used for tracking power delivered to a load from a power source. Peak power trackers are disclosed in U.S. Pat. No. 5,493,204 issued to Caldwell on Feb. 20, 1996, and in U.S. Pat. No. 4,794,272 issued to Bavaro on Dec. 27, 1988. These maximum peak power trackers can be applied to solar arrays providing power to a load where the peak power trackers track the power being delivered from the solar arrays and adjusts operating parameters to maximize the amount of power delivered from the solar array for powering the load. Shared bus current sharing for current mode DC-DC converters is disclosed in U.S. Pat. No. 6,009,000 issued to Siri on Dec. 28, 1999. The shared bus is used for equalizing power delivered through a plurality of converters that convert solar array power into regulated power for powering the load.

The apparatus of Caldwell fails to operate consistently over wide operating ranges depending on the solar array voltage and the current power operating point. The solar array voltage is detected by capacitive differentiation for controlling the duty cycle of a pulse width modulated control signal. Normally, as the solar array voltage increases, the capacitive differentiation voltage increases producing an increase in a pulse width modulation duty cycle increasing the power operation point until passing the peak power point. As the solar array voltage decreases, the capacitive differentiation voltage decreases causing a decrease in the duty cycle providing a decrease in the power operating point. The duty cycle increases and decreases to operate the apparatus dithering about the peak power point. The apparatus fails to function when the solar array voltage has settled at a low voltage when the apparatus operates below the peak power point in a low voltage trapped state. The capacitive differentiation method cannot absolutely detect the slow changes in the solar array voltage after the solar array voltage becomes steady far below the peak power point on the lower voltage side of the peak power point in a power versus array voltage curve. The apparatus may fail to operate at the peak power point when the solar power initially increases from zero after a black out. The solar array voltage initially starts far below the peak power point level on the lower voltage side of the peak power point in the power versus voltage curve profile. In the trapped state, when the solar array voltage changes slowly, the capacitive differentiation method may fail to detect small voltage changes. When the array voltage is low, increasing the duty cycle draws additional current from the solar array tending to further reduce and collapse the array voltage into the low voltage trapped state.

The apparatus of Caldwell also has inherent instability. The apparatus may not function at or near the specific peak power point when the solar array has a high amount of voltage ripple as the apparatus dithers about the peak power point. As the solar array characteristics widely change due to aging and environmental factors. The peak power point and amount of ripple also changes significantly over varying conditions. The Caldwell apparatus does not ensure that the solar array voltage ripple around the peak power point can be controlled to be negligible as compared to the average value of the operating array voltage. Because the array source and load conditions vary, the array voltage ripple around the operating value is unpredictably large. Due to lack of a precise control to limit the array voltage ripple, a large filtering capacitor reduces the ripple, but a large filtering capacitor causes slow changes in the solar array voltage undetectable by capacitive differentiation. A large amount of unpredictable ripple can not be effectively reduced by a fixed value capacitor. Hence, the apparatus cannot sustain the stability of the array voltage within a predetermined ripple amplitude.

Bavaro teaches a peak power tracker that is applied to a stand-alone single DC-DC converter. The use of several power converters could be used to increase the amount of power delivered but would necessarily require additional control circuitry, and, the power delivered to the load may be unequal amongst the converters. Also, the peak power tracker uses a dither signal having a predetermined dither frequency operating in the presence of differing operating conditions. The use of the dither signal avoids initial low voltage trapping. The peak power tracker also uses a second order band-pass filter to detect the converter output current at the dither frequency. The dither signal is compared to the output current signal for controlling the peak power tracker. In practice, a second-order band-pass filter may not be precisely tuned to a center frequency at the dither frequency resulting in operation off the peak power point.

A slow varying control voltage signal modulates a pulse width modulated signal for controlling the DC-DC converter. The dither signal is coupled with the solar array voltage so that very small changes in the solar array voltage can be detected for controlled operation at the peak power point. However, small fluctuations of the pulse width modulation control signal does not guarantee insignificant ripple of the solar array voltage at all conditions under the sun illuminations because the solar array voltage is not effectively regulated over varied amounts of sun illumination and temperature. The peak power tracker cannot regulate the array voltage ripple to a predictable amplitude. The peak power tracker does not regulate the array voltage disadvantageously resulting in unregulated array voltage ripple. The slow pulse width modulation control signal has only two states, increasing and decreasing states and fails to provide regulated solar array voltages during steady state conditions with reduced ripple. The solar array voltage ripple can disadvantageously cause excessive and uncontrolled and imprecise operational dithering about the peak power point. These and other disadvantages are solved or reduced using the invention.

SUMMARY OF THE INVENTION

An object of the invention is to provide maximum power from a power source to a load using a DC-DC power converter.

Another object of the invention is to provide maximum power from a power source to a load using a plurality of power converters providing equal contribution in converted power.

Yet another object of the invention is to provide a system for connecting a plurality of converters in parallel for delivering power from a power source for powering a load.

Still another object of the invention is to provide a plurality of DC-DC converters in a power system with maximum peak power operation for converting power from a solar array power source for powering a load.

A further object of the invention is to provide bus stabilization used in a peak power tracking control loop for improved maximum power tracking during over demands by a load and regulated power during under demands by the load.

Yet a further object of the invention is to provide a common dither signal for stabilizing maximum power tracking amongst a plurality of power converters for converting maximum power from a power source for powering a load.

The invention is directed to a maximum power tracker system for providing maximum peak power delivered from a power source to a load. The power source may be as a solar cell array. The maximum power tracker system provides processing management to deliver maximum power to the load depending on available power from the solar array source or sources of similar characteristics. The maximum power tracker system can deliver power to a large class of loads without clamping an output voltage to an optional load battery connected to the load as a backup power source. An output filter capacitor, coupled across the load, is sufficiently large to filter voltage ripples for voltage stabilization around the selected dither frequency. The maximum power tracker system can be applied to a constant power load by using a bus stabilizer coupled across the output voltage. At a frequency above the center frequency of the bus stabilizer, damping effects are created to sufficiently ensure output voltage stability without oscillations due to negative resistance characteristics of the constant power load. The maximum power tracker system can be used to support existing standardized DC-DC converters that use current-mode control in an innermost control loop. For example, parallel-connected current mode DC-DC converters will operate normally in an output voltage regulation mode until the available power from the solar array drops below the load demand when the output voltage loses regulation. When the output voltage is below the regulation level, the maximum power tracking mode of operation is automatically activated and consequently sustains the output voltage below but closest to the regulated level for supplying maximum power to the load.

The maximum power tracker system uses two two-state sample and hold circuits and two lowpass filters to detect the changes in the sampled array input voltages and the load current dithered at a dithered frequency. The rate of change in the load current at low frequency is in the same direction of the change in power drawn from the array so that the load current is an indication of available array power. The array power and voltage signal are used to control the DC-DC converters for maximum power tracking. The lowpass filters in a maximum power tracker have a broad bandwidth suitable for dither frequency detection operation in the presence of loose tolerances of component values selected during manufacturing. The corner frequency of the lowpass filter is above the dither frequency but significantly below one half of the sampling frequency of the two-state sample-and-hold circuits to prevent aliases effect. The first order lowpass filters can be consistently manufactured.

The maximum power tracker uses synchronized maximum power tracking for different solar array sources by using a common dither signal for ease of system control and improved performance. The maximum power tracker utilizes a solar array voltage regulation control mode that regulates the solar array voltage to a predetermined set point that changes very slowly as compared to the closed loop dynamics. The array voltage regulation control ensures that the solar array source observes the DC-DC converter as a resistor load at low frequencies without negative impedance despite a constant power load terminated across the converter output. The maximum power tracker control circuit generates the set point signal to control the array voltage. At any time, the set point signal is in an increasing slowly, decreasing slowly, or constant maintaining state. The set point signal smoothly varies the array voltage using an array regulation control loop without ripple instability. The solar array voltage control loop has a fast response time to ensure the reliable solar array voltage regulation. The fast response of the solar array voltage control loop is achieved using an input bus stabilizer terminated across the input of the current mode DC-DC converter. The input bus stabilizer significantly attenuates resonant peaking introduced by the line filter inductance and net capacitance across the converter input including the solar array capacitance so that the crossover frequency at 0 dB of the array control loop gain extends between 5 kHz to 15 kHZ unity loop gain bandwidth for efficient array voltage stabilization.

The maximum power tracker provides controlled tracking around the peak power using the small dither signal, such as a 0.1 volt 500 Hz signal, that is superimposed on the set point signal prior to feeding the composite signal to the array voltage control loop as a commanding reference signal. The dither signal has small amplitude at a much lower frequency as compared to the array control loop crossover frequency. The dither signal ensures that the array voltage is regulated to the set point signal so that the solar array voltage ripple is controlled to a predetermined amplitude and frequency in the presence of changes in the peak power point conditions due to the varied sun intensity and temperature imposed on the solar array. The maximum power tracker uses the slow changing set point signal defined by the different operating states including the increasing state, the decreasing state, and the constant maintaining state, the later of which for maintaining maximum power tracking in the presence of varying amounts of available power from the solar arrays and varying amounts of demands from the load.

Near uniform current sharing amongst the plurality of parallel connected DC-DC converters is achieved without conflicts in output voltage regulation using a shared bus signal. The maximum power tracking system can use redundant shared buses for fault tolerance eliminated a single point failure of the shared bus. The use of the two shared buses is an add on feature without requiring internal circuit modifications of the parallel connected DC-DC converters. These and other advantages will become more apparent from the following detailed description of the preferred embodiment.

DETAILED DESCRIPTION OF THE PREFERRED EMBODIMENT

Figure 1:
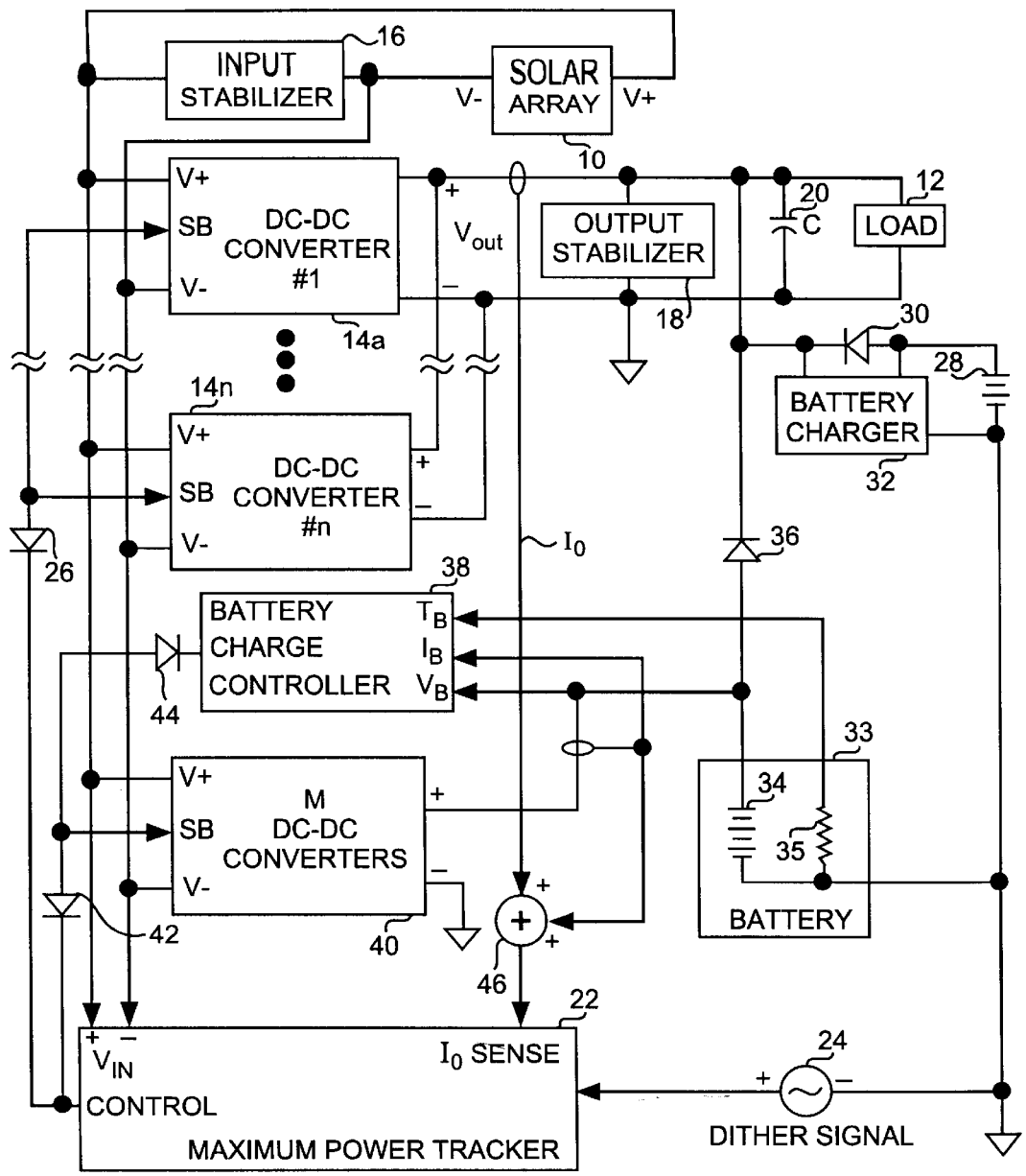
FIG. 1 is a block diagram of a multiple converter maximum power tracking system.

An embodiment of the invention is described with reference to the figures using reference designations as shown in the figures. A maximum power tracking system may be implemented in various configurations. Referring to FIG. 1, a solar array 10 collects varying amounts of solar power for supplying power a load 12 having varying amounts of load demand on an output voltage VOUT. The array 10 is connected in parallel to an n plurality of parallel-connected DC-DC converters 14a through 14n through an input stabilizer 16. The converters 14a–n are in turn connected in parallel to the load 12 through an output stabilizer and an output capacitor 20. A maximum power tracker 22 receives a dither signal from a dither signal generator 24, and receives a VIN input voltage as the V+ and V− output voltages of the solar array 10 for providing a control output for controlling the operation of the converters 14a–n through a shared bus diode 26 and a shared bus signal (SB). The control signal and shared bus signal control the operation of the converters 14a–n for delivering maximum power available from the array 10, coupled to the VIN voltage signal, to the load 12, coupled to the VOUT voltage signal.

A load battery 28 is connected through a load diode 30 that is in turn connected to a load battery charger 32. The battery charger 32 is connected across the output voltage VOUT to replenish the battery charge of battery 28. A battery charge controller 38 and one or more M DC-DC converters 40 are used to control current and voltage provided to an external battery module 33. The battery charge controller 38 is used to control the charging of the external battery module 33 using the M DC-DC converters 40, where M is any desired number of charging DC-DC converters. The associated battery charger circuitry 32 and 38 and converters 40 function independently from the converters 14a–n. The external battery module 33 consisting of a battery 34 and thermister 35, may be also connected to the load 12 through an external diode 36. The battery charge controller 38 monitors the temperature of the battery module 33 using the thermister 35 and a TB battery temperature input, monitors the battery charging current from the M DC-DC converters 40 using an IB battery current input, and also monitors the battery charging voltage VB for controlling the amount of charging of the battery 34. The two battery charger mechanisms, including charger 32, and including controller 38 and converter 40, provide redundant battery charging when desired. The battery charging controller 38 and the M DC-DC converters 40 are also controlled by the maximum power tracker 22 through shared bus diodes 42 and 44. The maximum power tracker 22 further receives an Io sense signal from a summer 46 that sums the load current Io to the load 12 plus the charging current IB to the battery module 33, for controlling the operation of the DC-DC converters 14a–n and 40 and battery controller 38. The maximum power tracker 22 controls the operation of the converters 14a–n and 40 to maximize the power delivered from the source 10 and battery module 33 to the load 12.

Figure 2:
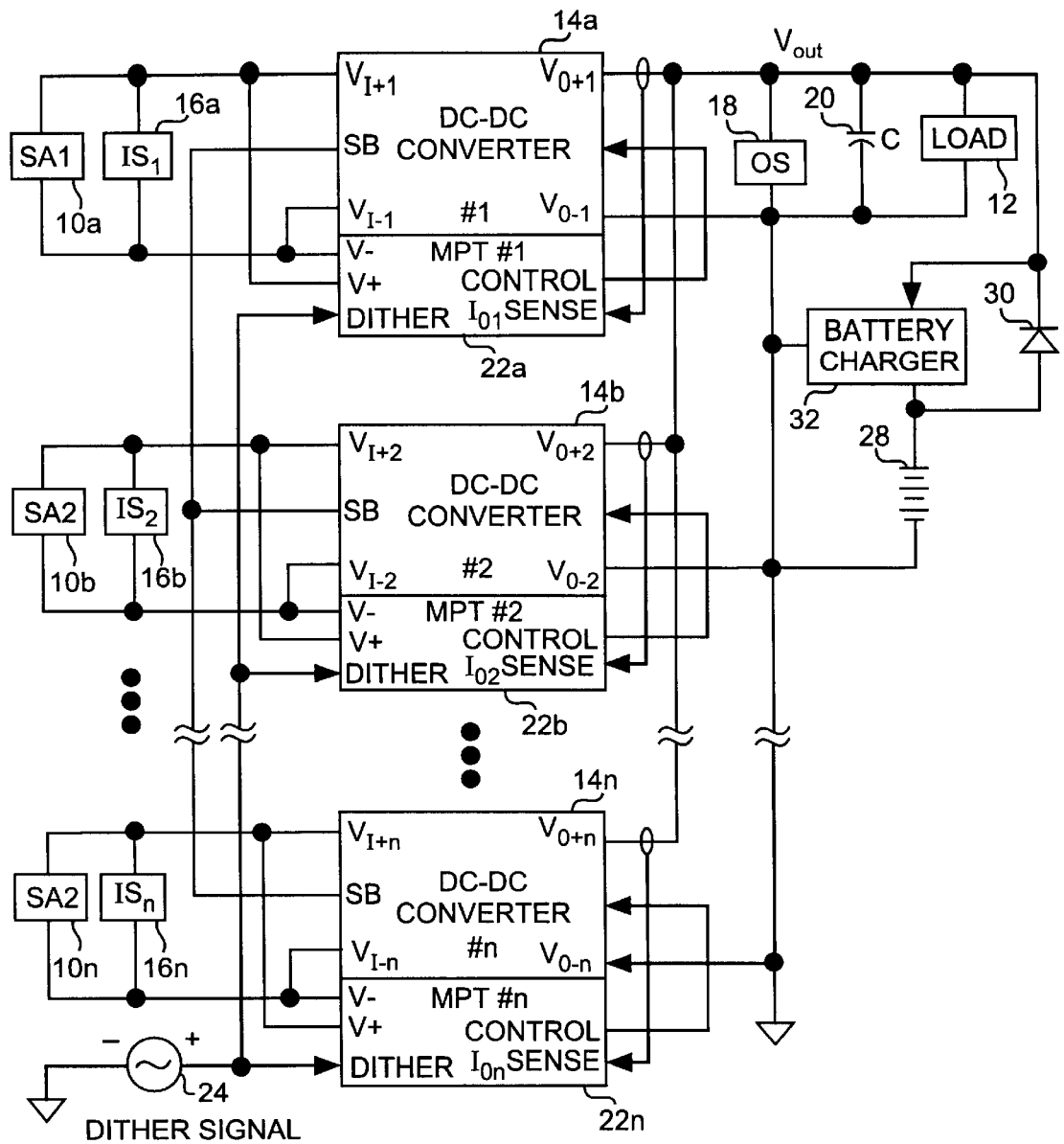
FIG. 2 is a block diagram of a parallel converter maximum power tracking system.

Referring to FIGS. 1 and FIG. 2, and more particularly to FIG. 2, another embodiment of the maximum power-tracking system is a paralleled converter maximum power-tracking system having an n plurality of solar arrays 10a–n respectively parallel connected to input stabilizers 16a–n and respective converters 14a–n that are in turn coupled to a respective number of n maximum power trackers 22a–n receiving a common dither signal from the dither generator 24. In this second preferred embodiment, a single battery charging mechanism, including the external battery 28, diode 30, charger 32, is used for providing back up power to the load 12 coupled across the output capacitor 20.

This maximum power-tracking system has distributed solar array sources 10a–n respectively connected to the +/−V inputs of the respective DC-DC converters 14a–n having respective individual maximum power trackers (MPT) 22a–n for controlling the respectively connected DC-DC converters 14a–n having a single common shared bus input (SB). In this distributive MPT configuration, each DC-DC converter 14a–n has a control signal input extending between the MPT 22a–n and converters 14a–n. During maximum power-tracking, some converters 14a–n may operate in an output voltage regulation mode while the remaining converters 14a–n may operate in a maximum power-tracking mode, depending on the amount of power available and sourced from the respective arrays 10a–n and depending on the amount of power demand of the load 12. Each MPT 22a–n senses the respective solar array voltages VI+ and VI− of the array 10a–n and senses the output Io current of the respective converter 14a–n for controlling the converter 14a–n in either the regulation mode or maximum power-tracking mode.

Figure 3:
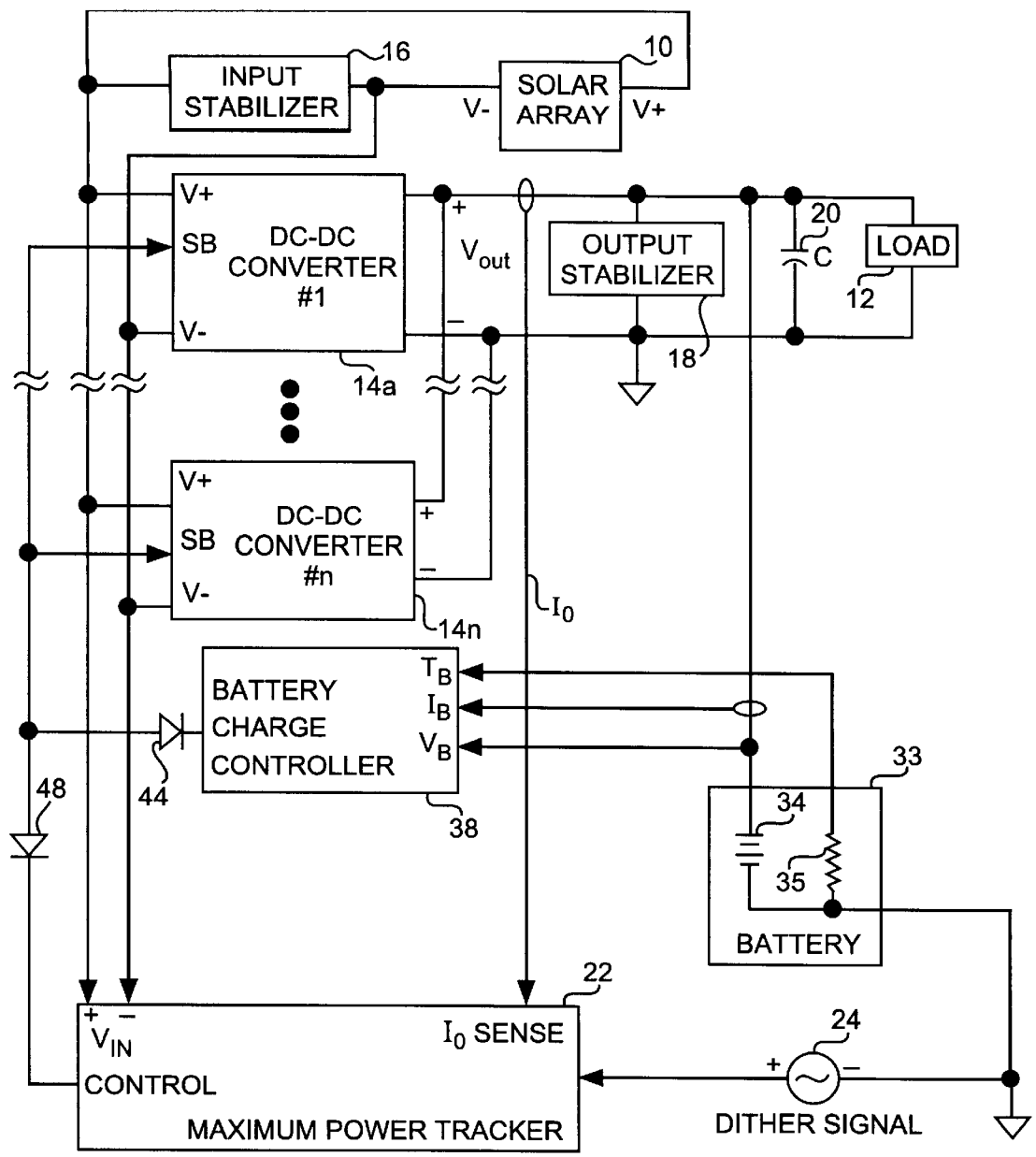
FIG. 3 is a block diagram of a multiple converter maximum power tracking system with a battery charge controller.

Referring to FIGS. 1, 2 and 3, and more particularly to FIG. 3, another preferred embodiment of the maximum power-tracking system includes the array 10, load 12, parallel connected DC-DC converters 14a–n, input stabilizer 16, output stabilizer 18, output capacitor 20, MPT tracker 22, dither signal generator 24, external battery module 33 with the battery 34 and the thermister 35, and the battery charge controller 38. A single shared bus (SB) having diodes 44 and 48 provides uniform current sharing between the DC-DC converters 14a–n, that is, with each converter 14a–n providing equal amounts of current to the load 12. When only one shared bus is used, a single-point failure exists without fault tolerance. A DC-DC converter 14 may not use the shared bus when the converter 14 is used as a stand-alone converter for a single source 10. Charging of the external battery 34 relies upon the collective power provided by the converters 14a–n to the load 12 and the operation of battery charge controller 38.

In the various embodiments, the maximum power-tracking system includes at least one MPT 22, at least one of the DC-DC converters 14a–n, and at least one solar array sources 10a–n providing power to a common load 12. The rate of change in the collective power transferred by the converters 14a–n is detected by sensing the output current Io on the Io sense line. The MPT 22 tracks the power available from the solar array source 10 using the Io sense signal and senses the solar array voltage VIN signal, for controlling the converters 14a–n in either the maximum power-tracking mode or the voltage regulation mode for providing maximum power to the load 12 under varying amounts of available solar power and under varying amount of load demand.

Figure 4:
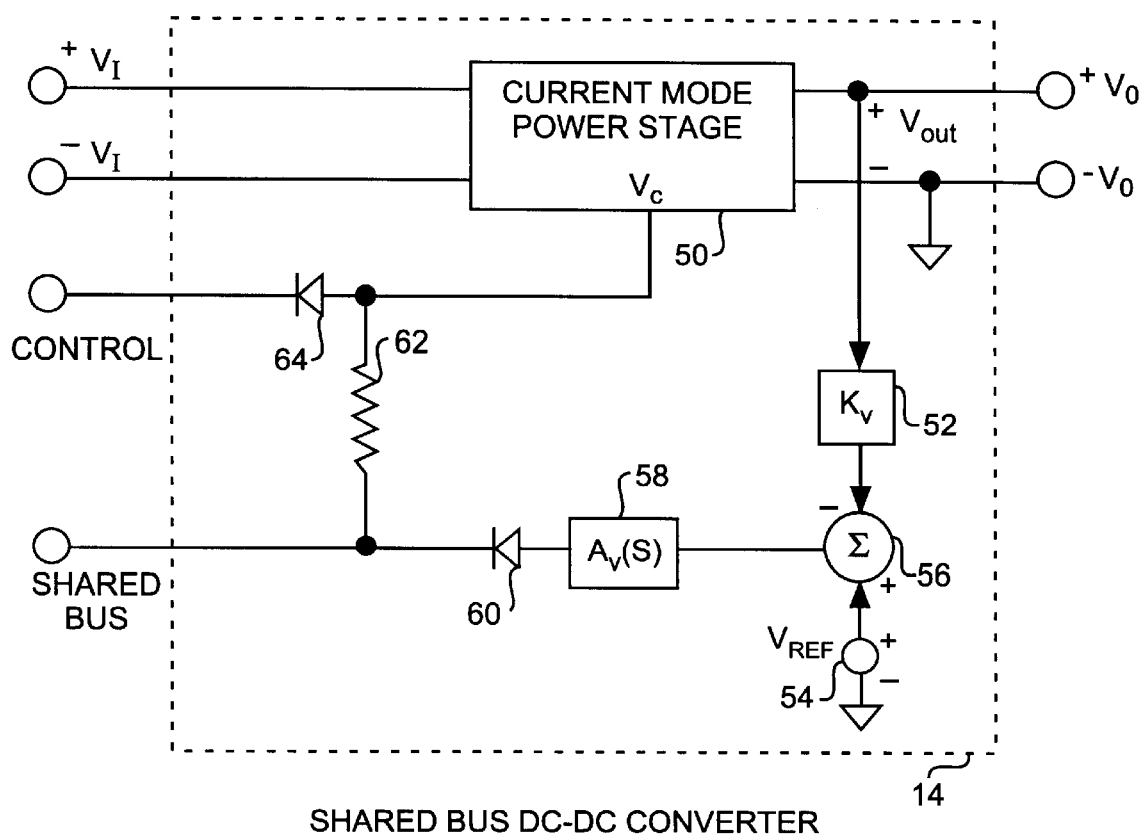
FIG. 4 is a block diagram of a shared bus DC-DC converter.

Referring to FIGS. 1–4, and more particularly to FIG. 4, a DC-DC converter 14 is operated in a voltage regulation mode when the load demand is less than the available peak power from the sources 10a–n, or operated in a maximum power-tracking mode when the load demand is more than the available peak power from the sources 10a–n. During the voltage regulation mode, the solar array 10 operates as a voltage source with low internal impedance driving the converter inputs +VI and −VI. The converter 14 includes a current mode power stage 50 that is connected between the +/−VI inputs from the solar array 10 and the VOUT output to the load 12. The current mode power stage 50 has a converter input Vc that controls power conversion. The VOUT output voltage is scaled by scalar 52 providing a KvVout signal that is subtracted by a summer 56 from a reference voltage Vref 54. The reference voltage $V_{ref}$ is used for regulating the output voltage VOUT. The sum of the reference voltage Vref and scaled output voltage KvVout is amplified by an error voltage amplifier 58 that provides an error voltage signal through a blocking diode 60 that is in turn connected to the shared bus. A resistor 62 is connected between the shared bus output and the Vc converter input signal. Another blocking diode 64 is connected between the control input and the converter input Vc of the current mode power stage 50. The converter input Vc of the current mode power stage 50 is a control signal originating from the bidirectional shared bus input or from the error amplifier 58 providing the error signal or from the MPT control signal. The resistor 62 and diodes 60 and 64 function together as a coupling means for coupling the share bus, error signal and control signal to the converter input $V_c$.

In the parallel converter configurations of FIG. 1 and 3, the control input connected to the DC-DC converter 14 is not used and remains open circuit. However, the control output from the MPT 22 is instead routed to the shared bus input connected to each of the converters 14a–n operating in tandem in either the regulation mode or the tracking mode. In the parallel configuration of FIG. 2, where each converter 14a–n has a respective MPT a–n with the shared bus input wired together as a single shared bus input into each of the converters 14a–n, each converter 14a–n can be independently operated in either the regulation mode or maximum power-tracking mode. The resister 62 connects the shared bus signal to the converter input signal Vc and to the error amplifier so that either the shared bus input or the error amplifier output, whichever is greater, can be used as the converter input signal Vc to the current mode power stage 50. The resistor 62 serves to isolate the shared bus from the respective control signal in each of the converters 14a–n in the parallel converter configuration of FIG. 2.

When the control signal from an MPT 22 is less than the shared bus signal and less than the error signal from the error amplifier 58, the MPT control signal drives the power stage converter input signal Vc to control the current mode power stage 50. When the MPT control voltage for a converter 14 is less than the shared bus voltage, the respective converter 14 is controlled by the respective control signal. When the control voltage for a converter 14 is greater than the shared bus voltage, the respective converter 14 is controlled by the shared bus signal that may driven by an error signal from any one of the remaining converters 14a–n. When an error voltage from an error amplifier 58 is less than the control signal but greater than error signal from the remaining converters 14a–n that would otherwise be communicated on the shared bus, this error signal will be communicated on the shared bus for controlling the operation of the remaining converters 14a–n including the respective current mode power stages 50 through the respective Vc converter inputs. In this manner, the control signal from the MPT 22 or an error signal from an error amplifier 58, one of which signals controls the shared bus, will control the operation of current mode power stage 50 of the converters 14a–n operated in either the regulation mode or the power-tracking mode. Hence, power conversion in the converter 14 is effectively controlled by the MPT control signal or the largest error signal of any one of the connected converters 14a–n.

The control signal and shared bus signal enable the converters 14a–n to be operated in either the voltage regulation mode or the maximum power-tracking mode. In the system configurations of FIGS. 1 and 3, all of the converters are operated in either the regulation mode or tracking mode concurrently. In the configuration of FIG. 2, when a first converter 14a is controlled by the control signal from the MPT 22 and the remaining converters 14b–n are controlled by the shared bus signal, then the first converter 14a operates in the maximum power-tracking mode and the remaining converters 14b–n operate in the regulation mode, such as would occur when the remaining solar arrays 10b–n are providing sufficient power to supply the load and the first solar array 10a is providing maximum but deficient available power under present operating conditions unable to provide an equal share of the total load current, when the remaining converters 14b–n provide uniform current sharing during regulation mode operation providing sufficient current for the demand of the load 12.

The maximum power-tracking system automatically adjusts operating conditions of the converters 14a–n to a maximum power point of the solar array sources 10a–n or to regulate the output voltage VOUT when the net load demand is below available power from the solar array sources 10a–n such as during peak solar power conditions. During the power regulation mode, near uniform current sharing among the parallel connected DC-DC converters 14a–n is achieved using the shared buses. The maximum power-tracking system uses the shared buses to provide operations at near uniform current sharing among the converters while concurrently providing maximum power-tracking in the regulation mode. Each DC-DC converter 14a–n provides current mode control using an internal current mode control loop within the current mode power stage 50 for regulating the current mode power stage 50 as a voltage controlled current source. When the shared bus input of several identical converters are connected together to form a single shared bus signal, all of the converters 14a–n are provided with the same controlling shared bus voltage, resulting in near uniform output currents drawn from the converters without conflicts in respective output voltage regulation.

Figure 5:
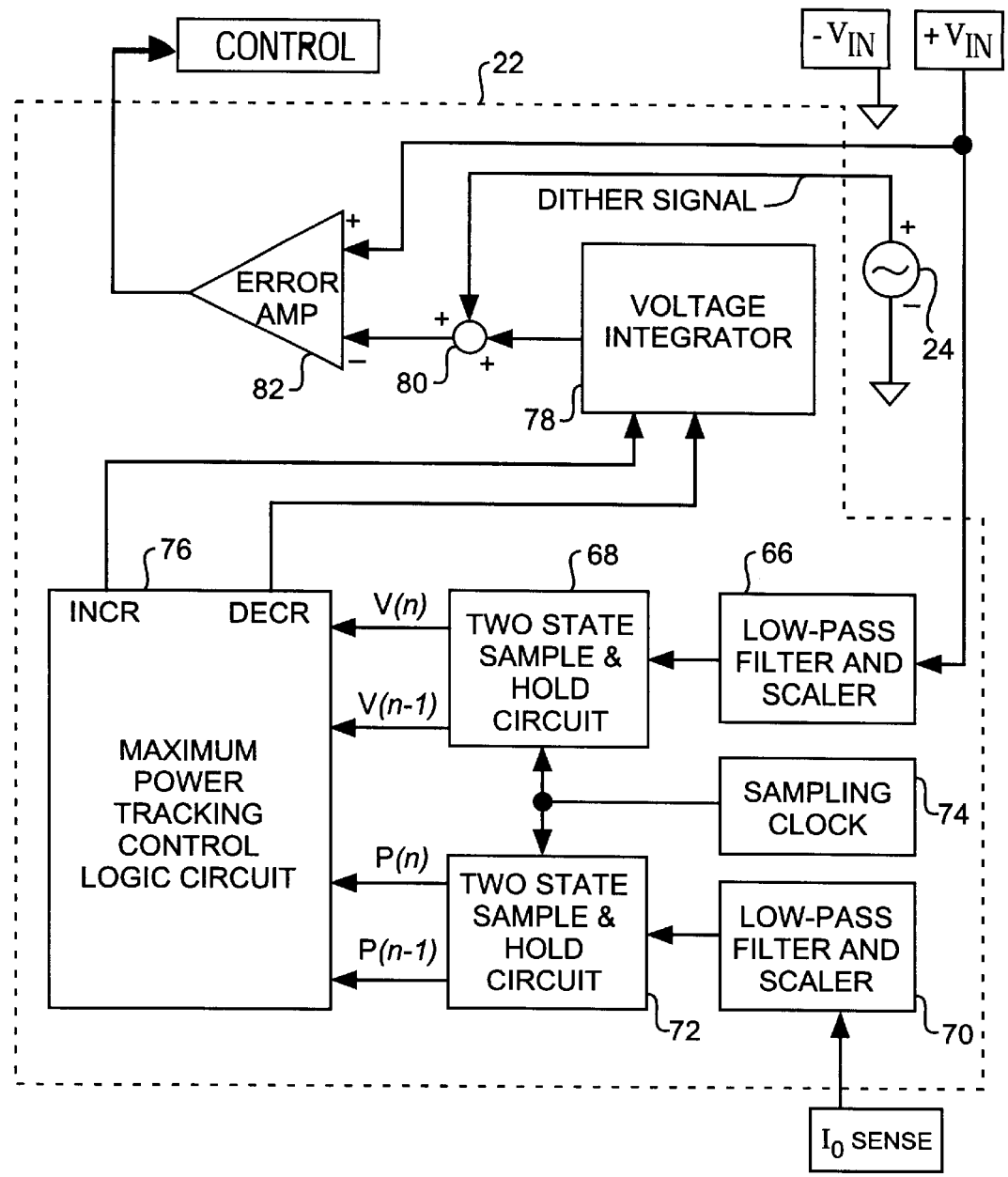
FIG. 5 is a block diagram of a maximum power tracker.

Referring to FIGS. 1 through 5, and more particularly to FIG. 5, a maximum power tracker 22 receives the Io sense signal, the dither signal and the +/–VIN signal, and provides the control signal. The solar array input voltage +/–VIN is passed through a first lowpass filter and scaler 66 providing a filtered and scaled input voltage signal to a first two-state sample and hold circuit 68 providing a present state voltage signal V(n) and a previous state voltage signal V(n-1). The Io sense signal is likewise communicated to a second lowpass filter and scaler 70 providing a filtered and scaled Io sense signal to a second two state sample and hold circuit 72 providing a present state power signal P(n) and a previous state power signal P(n-1). The two-state sample and hold circuits 68 and 72 respectively sample the filtered and scaled voltage and Io sense inputs at sampling intervals as determined by a sampling clock 74. The present and previous state signals P(n) and P(n-1), and V(n) and V(n-1) provide an indication of a positive or negative direction of the Io sense and VIN input signals. The increment INCR and decrement DECR signals define three operating states, an increasing state, a decreasing, and a constant maintaining state. The present and previous state signals P(n), P(n-1), V(n), and V(n-1) are fed into a maximum power-tracking control logic circuit 76 providing the increment INCR and decrement DECR signals to a voltage integrator 78 that in turn provides a tracking signal to a summer 80. The integrator 78 clamps the tracking signal between minimum and maximum voltage levels. The summer 80 sums the tracking signal with the dither signal for providing a set point signal that is dithered about the tracking signal. The set point signal and voltage input signal VIN are fed into an error amplifier 82 providing the control signal of the maximum power tracker, that in turn controls the VIN signal under close loop control. The error amplifier 82 provides feed back control loop operation for controlling the input voltage VIN of the solar arrays 10a–n.

When the logic circuit 76 is in the increasing state, when the increment INCR signal is active and the decrement signal is inactive, the VIN array voltage is controlled to be increasing. When the logic circuit 76 is in the decreasing state, when the increment INCR signal is inactive and the decrement DECR signal is active, the VIN array voltage is controlled to be decreasing. When the logic circuit 76 is in the constant state, when both increment INCR and decrement DECR signals are inactive, the array VIN array is controlled to be constant and maintained at the present VIN level. The voltage integrator 78 provides a linearly increasing tracking signal when receiving an increment INCR signal during the increasing state, provides a linearly decreasing tracking signal when receiving a decrement DECR signal when in the decreasing state, and provides a constant maintaining tracking signal when the increment INCR and decrement DECR signals are inactive, in the constant maintaining state. The tracking signal is summed with the dither signal 24 to provide the set point signal that AC dithers about the DC voltage level of the tracking signal. The error amplifier 82 receives the set point signal that is used to control the VIN array voltage under negative feedback closed loop control for generating the control signal for controlling and stabilizing the VIN array voltage. The converter input signal Vc controls the converter 14 as a voltage controlled current source at the VOUT output of the converter 14. Hence, the maximum power tracker MPT is used to control the solar array outputs +/−V by regulating the converter input VIN through the converters 14 using the error amplifier 82 and the MPT control signal. In the converter 14, the converter signal Vc is used to change the input impedance of the converter 14 that adjusts the VIN voltage that is the solar array output voltages +/−V. At the input of the converter 14, the control signal functions to control the converter 14 as a voltage controlled voltage sink during closed loop control using the error amplifier 82 for maximum power-tracking.

Figure 6:
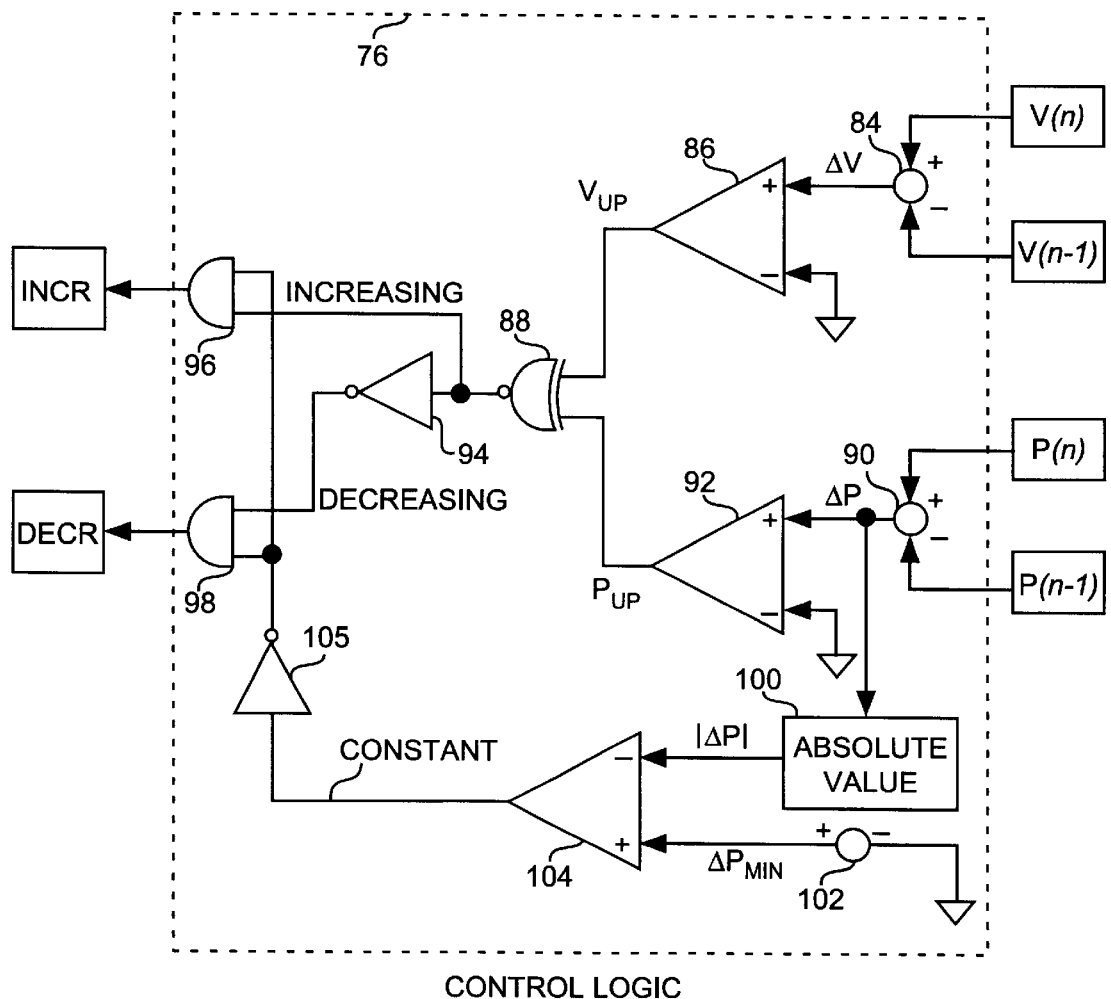
FIG. 6 is a block diagram of control logic.

Referring to all of the FIGURES, and more particularly to FIGS. 5 and 6, the control logic 76 has four analog inputs including V(n), V(n−1), P(n), P(n−1) and has two logical outputs including the increment INCR and the decrement DECR output signals. The analog inputs V(n) and V(n−1) are the present and the previous analog voltages representing the two solar array voltage VIN sampled at two adjacent sampling times one sampling period apart. The two analog inputs P(n) and P(n−1) are the present and the previous analog power signals, respectively, representing the two analog samples of the converter output current at the two adjacent sampling times one sampling period apart. When the algebraic difference between P(n) and P(n−1) signals, that is ΔP=[P(n)−P(n−1)] have the same mathematical sign, the power level is changing in the same direction. Changes in power delivered by a solar array 10 is related to the converter output current Io to the load, and hence the power from the solar array 10 is related to the output current sense signal Io sense. The lowpass filter and scaler 70 filter the dither signal to extract an average current signal from the output current Io sense. Likewise, the lowpass filter and scaler 66 filter the dither signal to extract an average solar array voltage signal VIN. The average output current delivered to the load 12 is related to the average power delivered by the solar array 10. The average output current is extracted within a sufficient period of time that is longer than any circuit time constant within the current mode power stage 50. The power from the solar array 10 delivered from the converter 14 is correlated in time with t he converter output current because changes in the converter output voltage is slow as compared to changes in the converter output current. Changes in the converter output current is also well correlated with the changes in the average output power and consequently with the changes in the average power of the solar array 10. As such, the algebraic difference between P(n) and P(n−1), that is ΔP, provides an indication of the direction of the change in the average power delivered from the array source 10. Similarly, the algebraic difference between V(n) and V(n−1), that is ΔV, provides an indication in the direction of the change in the average voltage of the solar array. The direction of the solar array voltage ΔV is fed into a logic comparator 86 providing a Vup signal, as the direction of the solar array power ΔP is fed into another logic comparator 92 providing a Pup signal. The Vup signal indicates an increasing solar array voltage and a Pup signal indicates an increasing solar array power signal, when active. Both of the directions signal Pup and Vup are compared by an exclusive NOR gate 88 providing an increasing state signal fed into an inverter 94 providing a decreasing state signal. The increasing state signal is fed into an AND gate 96 providing the increment signal INCR indicating an increasing state. The decreasing state signal is fed into another AND gate 98 providing the decrement signal DECR indicating the decreasing state. In neither a decreasing state or an increasing state, the increment and decrement signals that are inactive define the constant maintaining state. Hence, the increasing, decreasing, and maintaining constant states are defined by ΔP power and ΔV voltage signals of the solar array 10 and are used to control the operation of the maximum power tracker 22.

An absolute value generator 100 converts the value of the power direction signal ΔP into an absolute power direction signal |ΔP| that is compared to a minimum power change reference ΔPmin by a comparator 104 providing a constant state signal that is inverted by an inverter 105 for disabling the gates 96 and 98 to render inactive the increment and decrement signals for indicating the constant maintaining state. During the constant maintaining state, when the absolute value of the power direction signal is less than the minimum power ΔPmin signal, the control logic 76 sets the tracking mode in the constant maintaining state with a guard band against noise that may corrupt a weak ΔP power signal so as to providing a stable constant maintaining state operation especially at or near the peak power point.

The ΔV signal is used for tracking control because the dither signal is superimposed upon array voltage signal under closed loop control so as to create a controlled ripple array voltage of adequate detectable amplitude to prevent system lock up. Under maximum power-tracking, the +/− V solar array voltage will not collapse toward zero even when the load demand is far above the maximum power available from the array 10. Likewise, the ΔP signal is used for tracking control because the power signal has an inherent ripple component because the Io sense signal is related to the solar array voltage that in turn controls the set point signal having the dither signal component. While the output of the converters 14a–n may provide an output current with inherent current ripple, the output capacitor 20 filters voltage ripples providing a smooth regulated voltage to the load 12.

Figure 7:
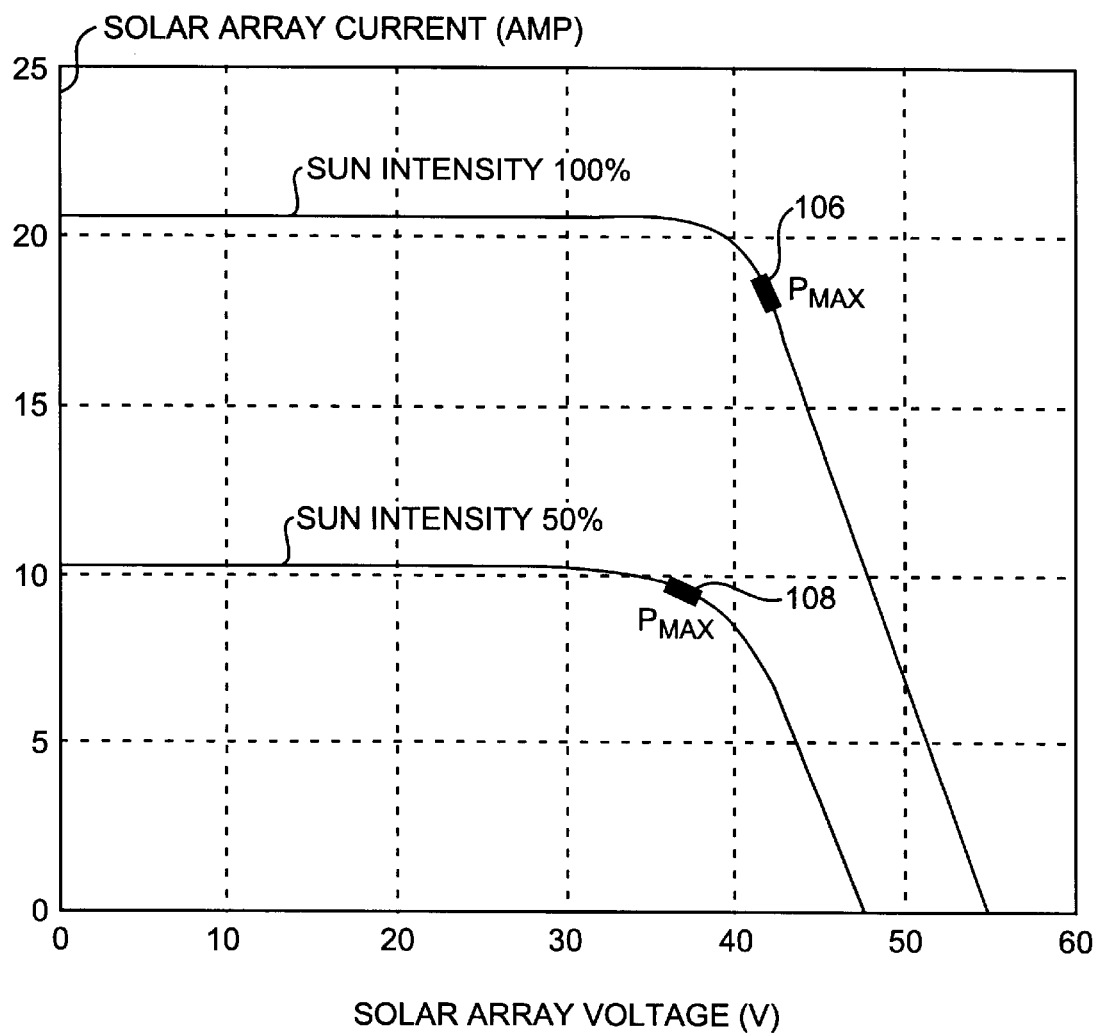
FIG. 7 is a graph depicting solar array current over solar array voltage.
Figure 8:
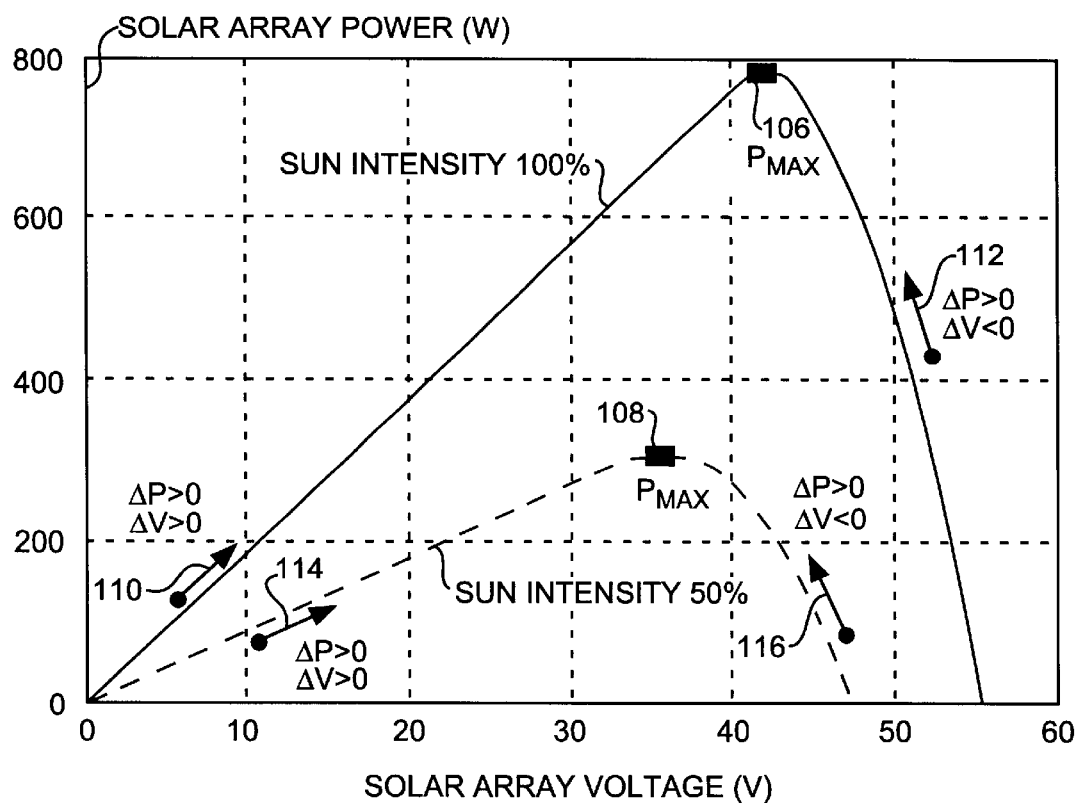
FIG. 8 is a graph depicting solar array power over solar array voltage.

Referring to all of the FIGURES, and more particularly to FIGS. 7 and 8, under varying intensities of solar illumination, the solar array 10 operates along a solar array current profile with current from the arrays related to the solar array voltage +/− V defining available solar array power. As shown, at 100% intensity, the solar array voltage may be controlled for operation at a first peak power point 106, and at 50% intensity, the solar array voltage may be controlled for operation at a second respective peak power point 108, as such would occur during maximum power-tracking operations. The available power from the array 10 is shown to have maxima 106 and 108 on respective solar array power profile curves for respective 100% and 50% solar illumination intensities. Under varying amounts of available power from the solar arrays 10, the maximum power tracker 22 operates to control the solar array voltage along the solar array power profile curve so as to maximize delivered powered from the solar array. At a 100% intensity low voltage point 110, when the MPT 22 is in an increasing state, the solar array voltage is controlled to be increasing so that $\Delta P$ and $\Delta V$ are positive values with increasing delivered power until reaching the peak power point 106. At a 100% intensity high voltage point 112, when the MPT 22 is in a decreasing state, the solar array voltage is controlled to be decreasing so that $\Delta P$ is positive and $\Delta V$ is negative with increasing delivered power until reaching the peak power point 106. About the peak power point 106, the MPT 22 controls the solar array voltage to be at a constant value to maintain operation at the peak power point. At a 50% intensity low voltage point 114, when the MPT 22 is in an increasing state, the solar array voltage in controlled to be increasing so that $\Delta P$ and $\Delta V$ are positive values with increasing delivered power until reaching the peak power point 108. At a 50% intensity high voltage point 116, when the MPT 22 is in a decreasing state, the solar array voltage is controlled to be decreasing so that $\Delta P$ is positive and $\Delta V$ is negative with increasing delivered power until reaching the peak power point 108. About the peak power point 108, the MPT 22 controls the solar array voltage to be at a constant value to maintain operation at the peak power point 108. Hence, under varying amounts of solar intensity, the MPT 22 functions to control the solar array voltage to provide maximum power available at the peak operating point. The solar array operating point is controlled to move along the array power curve until reaching the maximum power point typically when the output voltage VOUT is below the regulated level during peak power-tracking. The VOUT voltage is typically regulated when the source 10 supplies sufficient power to meet the load demand of the load 12 when the source 10 may not be operated at the peak power point. The output filter capacitor 20 is sufficiently large to hold the output voltage constant over a period of the dither signal used for maximum power-tracking so that the total output current of a paralleled converter configuration is proportional to the system output power. Hence, the output capacitor 20 is large for ensuring voltage stability at the VOUT output even when the MPT 22 is in the peak power-tracking mode. The output bus stabilizer may be a passive R-C circuit providing AC damping for securing system stability when operating in the voltage regulation mode. For the system configurations shown in FIGS. 1 and 2 the system output VOUT may be clamped to a battery voltage of batteries 34 or 28 when the VOUT output voltage drops out of the regulation mode and into the maximum power-tracking mode.

Under maximum power-tracking control, when the load demands exceeds a level corresponding to the maximum available power from the solar array 10, the solar array operating point will be at the maximum power point and the converter output voltage VOUT will lose regulation. The MPT 22 is operated in a solar array voltage regulation mode when the array voltage is clamped to the predetermined set point. The predetermined set point is dynamically updated by the maximum power-tracking logic based on the sensed changes in the array power and the array voltage. The maximum power-tracking logic continuously updates the set point signal that dithers about the tracking voltage corresponding to the maximum power point. The paralleled DC-DC converters 14$a$–$n$ use the input bus stabilizers 16$a$–$n$ terminated across the solar array +/–V input voltage located close to the VIN input of the converters 14$a$–$n$, to damp out AC energy for ensuring the system stability during maximum power-tracking. The input bus stabilizer across the array voltage ensures that array voltage ripples are acceptably small.

Maximum power-tracking uses a known dither signal injected into the control loop so that load current and source voltage signals are dithered for reliable isolation and detection in a control manner. The ripple frequency of the solar array input VIN voltage is known to be fixed at the same frequency of the dither signal. Using the dither signal injection to perturb the maximum power-tracking control loop, the system avoids operation in a trapped state occurring at the solar array voltage settled far above or below that of the peak power point. Consequently, many MPTs 22$a$–$n$ for different array sources 10$a$–$n$ that are not connected in parallel can be set to operate synchronously by sharing the same dither signal in the increasing, decreasing, and constant states so that a steady state condition is the same for all DC-DC converters 14$a$–$n$ being controlled. The frequency of the dither signal is selected to be significantly below the resonant frequency formed by the net capacitance across the solar arrays 10$a$–$n$ and the inductances within the bus stabilizers function as in line input filters of the DC-DC converters 14$a$–$n$.

The invention is directed to a maximum power-tracking system for maximizing power delivered from an input source, such as a solar array. The system can be used to supply power to a sixty-hertz utility grid for more efficient power generation. In spacecraft applications having electric propulsion systems, the MPT system can maximize the traveling distance. In communications systems, MPT system maximizes the signal-to-noise ratio of the microwave or RF links by providing maximum available power of the attached solar arrays. In the automotive industry, the solar MPT system can maximizes the traveling distance of electric vehicles. The MPT system has several possible configurations. Those skilled in the art can make enhancements, improvements, and modifications to the invention, and these enhancements, improvements, and modifications may nonetheless fall within the spirit and scope of the following claims.

What is claimed is:

1. A system for providing power from a source providing source power at a source current at a source voltage to a load receiving load power at a load current at a load voltage, the load having variable amounts of load demand for the load power, the source providing variable amounts of the source power, the system comprising, a converter coupled between the source and the load, the converter for converting the source power into the load power, and a maximum power tracker connected to the converter and the source for controlling the source power and the load power, the maximum power tracker sensing the load current and source voltage and controlling the converter for maximizing the source power to a peak power point at a respective peak power source voltage when the load demand exceeds the source power, the maximum power tracker increasing the source voltage for increasing the source power toward the peak power point when the source power is below the peak power point and the source voltage is below the peak power source voltage and when the load demand exceeds the source power, the maximum power tracker decreasing the source voltage for increasing the source power toward the peak power point when the source power is below the peak power point and when and the source voltage is above the peak power source voltage and when the load demand exceeds the source power, the maximum power tracker maintaining the source voltage constant at the peak power source voltage when the source power is at peak power point and when the load demand exceeds the source power, the maximum power tracker generating a control signal for controlling the converter to control the source voltage for operating the source at the peak power point when the load demand exceeds the source power, the maximum power tracker controlling the converter for peak power tracking when increasing or decreasing or maintaining the source voltage when the load demand exceeds the source power, the maximum power tracker regulating the load voltage at a regulated load voltage when the available powers from the source exceeds the load demand.

2. The system of claim 1 further comprising, an input bus stabilizer coupled to the source voltage for stabilizing under the closed loop control a control loop extending through the converter and maximum power tracker along the source voltage and the control signal, an output bus stabilizer coupled to the load for stabilizing a regulation control loop extending through the load voltage and the converter, and output current sensor for sensing the load current and providing the maximum power tracker with the load current signal.

3. The system of claim 1 further comprising, an external battery for storing external battery power having a battery current and battery voltage, a thermister providing a temperature signal, the external battery coupled to the load for providing power to the load when the load voltage is less than the external battery voltage a battery converter for providing battery current and battery voltage to an external battery and a battery controller for controlling the battery converter through a battery control signal for charging the external battery at the battery voltage and battery current dependent on the temperature of the battery.

4. The system of claim 1 further comprising, a load battery for storing power at a load battery voltage, the load battery coupled to the load for providing power to the load when the load voltage is less than load battery voltage, and a load battery charger for charging the load battery when the load voltage is regulated.

5. The system of claim 1 wherein the source is a solar power source.

6. The system of claim 1 wherein, the maximum power tracker serves to maximize the amount of source power converted into the load power when the load demands exceeds the source power.

7. The system of claim 1 wherein the converter is a plurality of converters coupled between the source and the load, each of the converters is coupled to the control signal serving as a bus signal to each of the converters to control the converters to provide equal current sharing contributions to the load current.

8. The system of claim 1 wherein the converter comprises, a power stage having a converter input signal for controlling the respective load current and load voltage to the load, and an error amplifier for sensing the load voltage and generating an error signal for regulating the load voltage to a regulation voltage when the source powers exceeds the load demand, the error signal driving the converter input signal during load voltage regulation, and a coupling means for coupling together the control signal and the converter input signal and the error signal, the converter input signal being the control signal when the control signal is lesser than the error signal during the peak power tracking when the load demand exceeds the source powers, converter input signal being the error signal when the control signal is greater than the error signal during load voltage regulation when the source powers exceeds the load demand.

9. The system of claim 8 wherein the regulation voltage is a reference voltage divided by a scalar.

10. The system of claim 8 wherein the maximum power tracker generates the control signal from the source voltage and a set point signal, the set point signal increasing when the source power is increasing and the source voltage is increasing, the set point signal decreasing when the source power is increasing and the source voltage is decreasing, the set point signal maintaining when the source is operating at the peak power point at the peak power source voltage, the set point signal and source voltage combined into the control signal driving the converter connected to the source voltage for controlling the source voltage to the set point signal under closed loop control.

11. The system of claim 10 wherein, the set point signal is dithered by a dither signal having a dither frequency for dithering the set point signal about a tracking signal, the set point signal serving to dither the source voltage and load current about the dither frequency, the maximum power tracker senses the source voltage and the load current at repetitive present and previous times for continuously providing and updating present and previous source voltage signals and for continuously providing and updating present and previous load current signals as present and previous source power signals, the present and previous source voltage signals defining a changed source voltage, the present and previous source power signals providing a changed source power, and the set point signal is increasing or decreasing or maintaining respectively when the tracking signal is increasing or decreasing or maintaining, the tracking signal increasing when the changed source power signal is increasing and when the changed source voltage signal increasing, the tracking signal decreasing when the changed source power signal is increasing and the changed source voltage signal are decreasing, the tracking signal maintaining when the changed source power signal is less than a predetermined minimum value.

12. The system of claim 11, wherein the maximum power tracker comprises, a first filter for filtering the source voltage having the dither frequency into a filtered source voltage signal, a first sample and hold circuit for sampling the filtered source voltage signal into the present and previous source voltage signals, a second filter for filtering the load current having the dither frequency into a filtered power signal, and a second sample and hold circuit for sampling the filtered power signal into the present and previous power signals.

13. The system of claim 11 further comprising, an input bus stabilizer coupled to the source voltage for stabilizing under the closed loop control a control loop extending through the converter and maximum power tracker along the source voltage and the control signal and the power stage and the converter input signal, an output bus stabilizer coupled to the load for stabilizing a regulation control loop extending through the load voltage and power stage and error amplifier and coupling means, and output current sensor for sensing the load current and providing the maximum power tracker with the load current signal, and an output capacitor for filtering ripples of the load voltage signal.

* * * * *